US008103508B2

(12) United States Patent
Lord

(10) Patent No.: US 8,103,508 B2
(45) Date of Patent: Jan. 24, 2012

(54) VOICE ACTIVATED LANGUAGE TRANSLATION

(75) Inventor: John Raymond Lord, Stittsville (CA)

(73) Assignee: Mitel Networks Corporation, Ottawa, Ontario (CA)

(*) Notice: Subject to any disclaimer, the term of this patent is extended or adjusted under 35 U.S.C. 154(b) by 1070 days.

(21) Appl. No.: 10/370,313

(22) Filed: Feb. 19, 2003

(65) Prior Publication Data

US 2003/0158722 A1    Aug. 21, 2003

(51) Int. Cl.
*G10L 21/00* (2006.01)

(52) U.S. Cl. ............. 704/270.1; 704/2; 704/8; 704/246; 704/251; 704/252

(58) Field of Classification Search ........................ None
See application file for complete search history.

(56) References Cited

U.S. PATENT DOCUMENTS

| | | | |
|---|---|---|---|
| 4,882,681 A | 11/1989 | Brotz | 364/419 |
| 5,784,456 A * | 7/1998 | Carey et al. | 379/419 |
| 5,870,454 A | 2/1999 | Dahlen | 379/100 |
| 5,875,422 A * | 2/1999 | Eslambolchi et al. | 704/3 |
| 6,161,082 A | 12/2000 | Goldberg | 704/3 |
| 6,173,250 B1 | 1/2001 | Jong | 704/3 |
| 6,175,819 B1 * | 1/2001 | Van Alstine | 704/235 |
| 6,219,638 B1 | 4/2001 | Padmanabhan | 704/235 |
| 6,219,646 B1 * | 4/2001 | Cherny | 704/277 |
| 6,385,586 B1 * | 5/2002 | Dietz | 704/277 |
| 7,035,804 B2 * | 4/2006 | Saindon et al. | 704/271 |
| 7,130,801 B2 * | 10/2006 | Kitahara et al. | 704/277 |
| 2002/0126654 A1 * | 9/2002 | Preston et al. | 370/352 |

FOREIGN PATENT DOCUMENTS

| | | |
|---|---|---|
| DE | 195 08 017 A1 | 9/1996 |
| EP | 0 953 918 A2 | 11/1999 |
| EP | 1 148 695 A2 | 10/2001 |
| WO | WO 99/46762 | 9/1999 |

OTHER PUBLICATIONS

Carlson et al.. "Application of Speech Recognition Technology to its Advanced Traveler Information Systems". Pacific Rim Transtech Conference. Vehicle Navigation and Information Systems Conference Proceedings. Washington, Jul. 30-Aug. 2, 1995, New York, IEEE, US, vol. conf. 6, Jul. 30, 1995, pp. 118-125.

* cited by examiner

*Primary Examiner* — Leonard Saint Cyr

(57) ABSTRACT

A voice activated language translation system that is accessed by telephones where voice messages of a caller are translated into a selected language and returned to the caller or optionally sent to another caller. A voice recognition system converts the voice messages into text of a first language. The text is then translated into text of the selected language. The text of the selected language is then converted into voice.

10 Claims, 3 Drawing Sheets

VOICE ACTIVATED LANGUAGE TRANSLATION

FIELD OF INVENTION

This invention relates generally to voice communication systems, and more particularly, the invention relates to a method and system for voice activated language translation.

BACKGROUND OF THE INVENTION

International travelers are accustomed to difficulties that may be encountered when communicating in a traveler's native language to a local person who does not speak the traveler's language. These difficulties are compounded when communicating via telephone because hand gestures and other body language may not be used to assist in conveying the meaning of a spoken phrase to the local person who is not fluent in the traveler's native language. Conventionally, travelers have resorted to language dictionaries in order to look up word translations, or ask for assistance from someone nearby who has the ability to translate on behalf of the traveler. However, the use of language dictionaries is cumbersome and time consuming, and having another person for translation may be very inconvenient and costly.

Electronic translation devices are available which allow a person to speak a phrase and have the device provide a spoken translation of the phrase. This electronic advance overcomes some of the difficulties in using conventional dictionaries. However, the use of such devices requires that the devices be carried for use or are otherwise available when needed. Thus, electronic translation devices are not cost effective or are inconvenient in certain applications such as retail stores, airports, hotels, and hospitals.

Retail stores may have large numbers of employees spread over large areas. In this environment, it would not be cost effective for each employee to carry a translation device in order to converse with customers in another language. Further, as the customers generally interact with the employees over large areas of the retail stores, it is inconvenient to either bring the translation devices to the customers or to take the customers to the translation devices. A similar environment exists at airports, hospitals and hotels.

A further disadvantage with portable electronic translation devices is their limited capabilities. For portability and cost effectiveness, these devices inherently must be small and lightweight. These features are typically traded off against limited capabilities such as less sophisticated voice recognition algorithms, less memory for words, and fewer languages.

SUMMARY OF THE INVENTION

According to an aspect of the present invention, a communication system is provided which allows a user to communicate with a voice activated language translation system (VALTS). The VALTS comprises a voice recognition system (VRS) for recognizing a voice message in a first language and converting the message into a first text in the first language; a text translation application for translating the first text into a second text in a second language; and a text-to-speech system for converting the second text into voice.

Preferably, the system is implemented using wireless telephone technology. Thus, for example, an English-speaking traveler at a hotel in a country where English is not normally spoken can use a wireless telephone to communicate with a person who speaks Spanish. The traveler accesses the VALTS by dialing a telephone number and sets the VALTS for English to Spanish translation, and thereafter sentences spoken into the wireless telephone are translated and returned in Spanish. The VALTS may be reset for Spanish to English conversion to translate the replies of the Spanish speaking person.

Accordingly to an aspect of the present invention, there is provided a voice activated language translation system that is accessed by telephones where voice messages of a caller are translated into a selected language and returned to the caller or optionally sent to another caller. A voice recognition system converts the voice messages into text of a first language. The text is then translated into text of the selected language. The text of the selected language is then converted into voice.

The advantages of the present invention include having very sophisticated capabilities at relatively low cost. As the VALTS is remotely located from the users at a central location, the size and space of the VALTS are not issues and the cost of the VALTS can be leveraged over a large number of users. Further, as the VALTS is accessed by telephones, the access means is already widely available. The VALTS may further be readily configured to present different services to different access telephone numbers. For example, it is possible to create thousands of commonly spoken phrases and words for different targeted environments, therefore one telephone number may provide access for hotel phrases while another telephone number may provide access for airport phrases.

According to another aspect of the present invention, there is provided a voice activated language translation system, comprising: a communication interface for handling at least one call to receive a voice message and to transmit a voice response; a voice recognition system connected to said communication interface for converting said voice message to a first text message in a first language and for converting a second text message to said voice response in a second language to transmit via said communication interface; and a language translation application connected to said voice recognition system for translating said first text message from the first language to said second text message in the second language and sending said second text message to said voice recognition system for conversion to said voice response.

According to another aspect of the present invention, there is provided a method of providing voice activated language translation, comprising: handling at least one call to receive a voice message; converting said voice message to a first text message in a first language; translating said first text message from the first language to a second text message in a second language; converting said second text message to a voice response in the second language; and handling said at least one call to transmit said voice response.

BRIEF DESCRIPTION OF THE DRAWINGS

The present invention will be described in detail with reference to the accompanying drawings, in which like numerals denote like parts, and in which.

DETAILED DESCRIPTION

Figure 1:
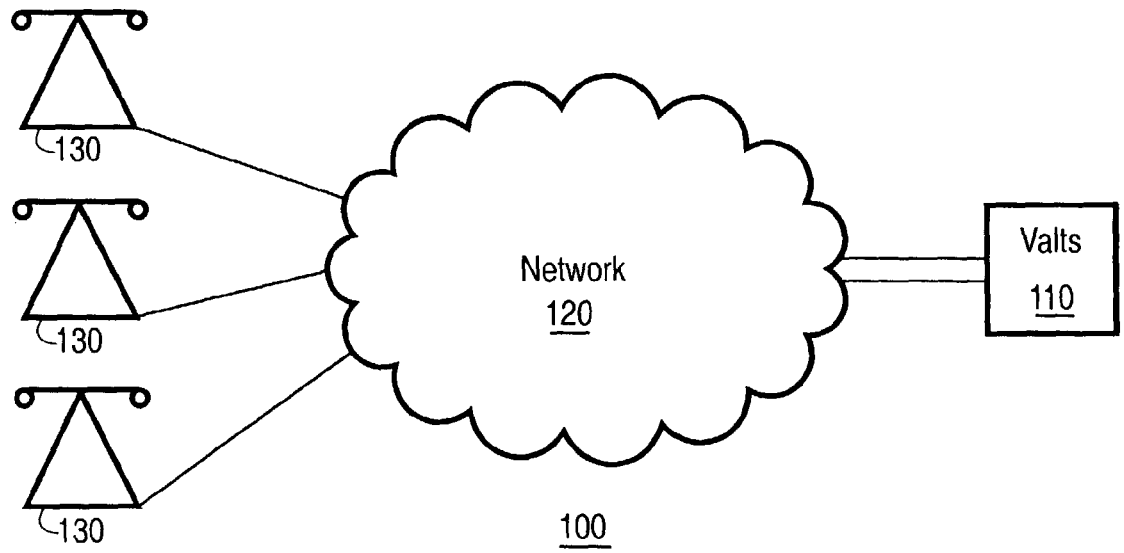
FIG. 1 is a block diagram of a communication system with a voice activated language translation system (VALTS) according to an embodiment of the present invention.

Referring to FIG. 1, there is shown a block diagram of a communication system 100 with a voice activated language translation system (VALTS) 110 accordingly to an embodiment of the present invention. The communication system 100 comprises the VALTS 110, a network 120, and communication devices 130. The network 120 includes the public switched telephone network (PSTN) and local area networks (LANs). The communication devices 130 include POTS and wireless telephones. The VALTS 110 has at least one telephone number for access by the communication devices 130.

Figure 2:
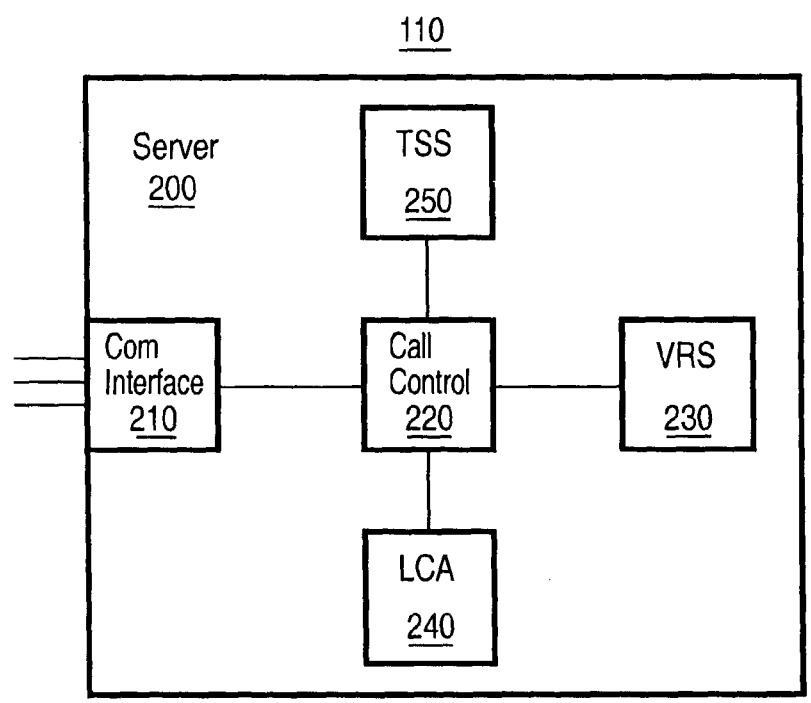
FIG. 2 is a block diagram of the VALTS of FIG. 1.

Referring to FIG. 2, there is shown a block diagram of the VALTS 110 of FIG. 1. The VALTS 110 comprises a server 200 having a communication interface 210 for interfacing with the network 120; a call control module 220 for handling voice calls from the communication devices 130; a voice recognition system (VRS) 230 for recognizing voice messages and converting the messages into text; a language conversion application (LCA) 240 for translating the text of one language into the text of another language; and a text-to-speech system (TSS) 250 for converting the text into voice of the another language. The VRS 230, the LCA 240, and the TSS 250 are well known in the art.

Two modes of operation are provided, but it will be understood that further modes may also be provided. In a first mode, a user at a communication device 130 accesses the VALTS 110, selects the second language for translation from the first language, and speaks phrases in the first language for translation into the second language. After each phrase, the VALTS 110 responds with a translated phrase in the voice speech of the second language. The user presents the translated phrase to another person. The user then resets the VALTS 110 to translate the second language to the first language for a response from the another person.

In the second mode, a plurality of users at respective communication devices 130 access the VALTS 110 for a conference call where the phrases spoken by one of the users are translated for the other users. Alternatively, the VALTS 110 may be set for all of the phrases spoken by each of the users to be translated for each of the other users. Further alternatively, the VALTS 110 may be set to translate only certain languages for certain users over one conference call. Additionally, the VALTS 110 may be set so that a user receives only the translated phrases and not the phrases in their first language. It will be understood by those skilled in the art that a number of permutations and combinations for setting the VALTS 110 are possible.

It will also be understood by those skilled in the art that the VALTS 110 may be set by a number of methods including commands entered via the keypads of telephones and via voice commands.

Figure 3:
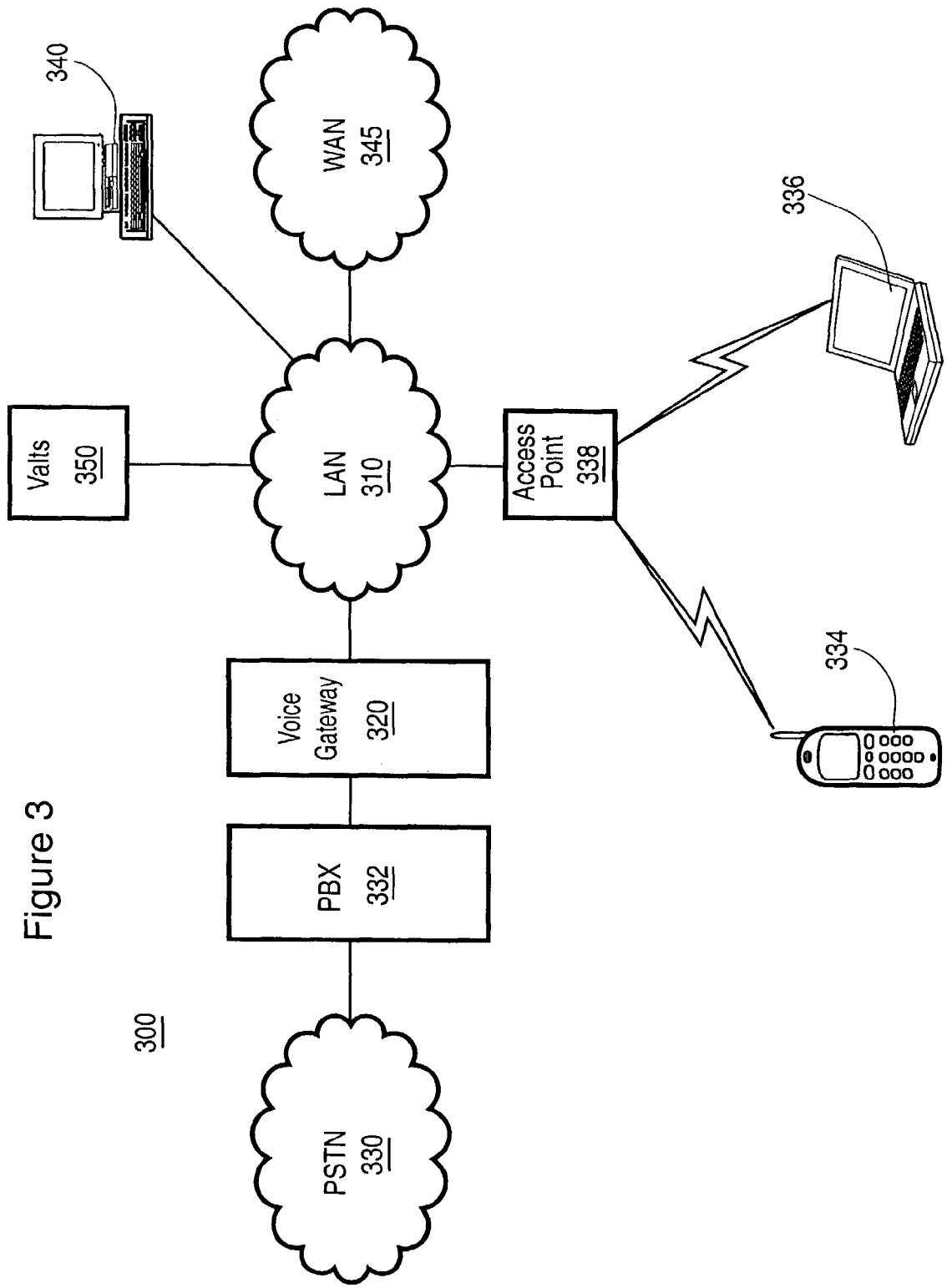
FIG. 3 is a block diagram of a communication system with a VALTS and a voice gateway accordingly to another embodiment of the present invention.

Referring to FIG. 3, there is shown a block diagram of a communication system 300 with a VALTS 350 and a voice gateway 320 according to another embodiment of the present invention. The communication system 300 provides Voice over IP services over a LAN 310 with the voice gateway 320. The services of the voice gateway 320 include PBX functions for switching voice calls from the PSTN 330 via a PBX 332 and from VoIP devices connected to the LAN 310. The VoIP devices include wireless phones 334 and laptops 336 connected to the LAN 310 via access point 338; and wired desktops 340. The VALTS 350 is one of the VoIP devices and has at least one directory number for access. To the voice gateway 320, the VALTS 350 appears as at least one IP phone. The VALTS 350 may be configured to emulate a large number of such virtual IP phones. Additionally, the VoIP devices may be connected to the LAN 310 via a wide area network (WAN) 345. The WAN 345 includes, for example, the Internet.

The VALTS 350, having virtual IP phones, is particularly advantageous in that the VALTS 350 is able to handle more calls simultaneously without having to add more hardware telephone lines as compared to another embodiment of the present invention where a VALTS is connected by standard POTS lines to a conventional PBX. Thus, the VALTS 350 is able to handle as many calls as the number of virtual IP phones that can be emulated.

It will also be understood by those skilled in the art that a VALTS may be a separate stand-alone server on a network, or the VALTS may be integrated with a PBX or voice gateway or another appropriate device connected to the network.

Figure 4:
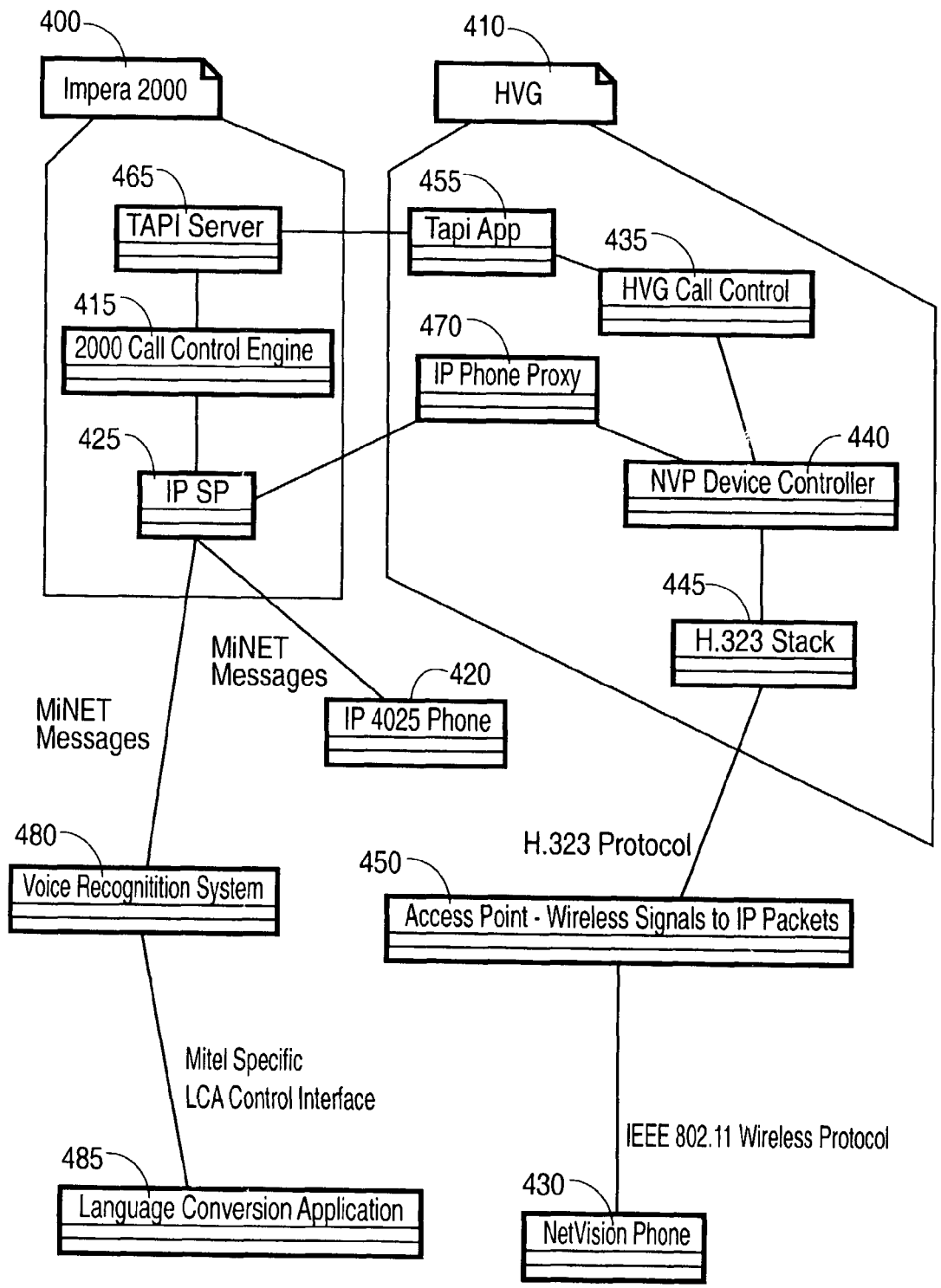
FIG. 4 is a block diagram of an implementation of a part of the communication system of FIG. 3.

Referring to FIG. 4, there is shown a block diagram of an implementation of a part of the communication system 300 of FIG. 3. The voice gateway 320 is implemented using a Mitel Ipera 2000 R2.1 communication system (the System) 400 with a H.323 Voice Gateway (HVG) 410. For reasons of simplicity in illustration, the System 400 in FIG. 4 is shown with only three end points: an IP phone 420, a wireless phone 430, and a VRS 480. In practice, a multiplicity of end points are provided and communications between them are controlled by a Call Control Engine 415.

The System 400 is a server-based, commercially available iPBX manufactured by Mitel Networks Corporation. The System 400 is implemented in a Windows® NT server, which has been modified to include telecommunications hardware. The Call Control Engine 415 provides communications control between end points, such as, the IP phone 420 (Mitel IP 4025 Phone), via an IP service provider (IP SP) 425. The IP SP 425 handles all TCP/IP communication with the endpoints.

The IP phone 420 is a stimulus device that sends and receives messages to and from the System 400 for all actions. The IP SP 425 processes all Minet messages received from the IP phone 420 and routes the Minet messages to appropriate software components in the System 400 for further processing. The Minet messages are part of a Mitel Networks Corporation proprietary message protocol (Minet protocol). The Minet protocol is used to create calls between IP phones. The IP SP 425 handles the streaming of data between IP phones and other endpoints under the control of the Call Control Engine 415.

The H.323 Voice Gateway (HVG) 410 is a commercially available option of the System 400. The HVG 400 interfaces H.323 compliant phone devices to the System 400 so that the H.323 compliant phone devices appear as IP phones.

The wireless phone 430 is a commercially available product, such as a Netvision Phone (NVP) from Symbol Technologies. The NVP 430 is connected to the communication system via an access point 450. The access point 450 converts wireless signals (IEEE 802.11 wireless protocol) of the NVP 430 to IP packets and visa versus. The IP packets are exchanged over the LAN 310 with the HVG 400 using the H.323 protocol.

At the HVG 400, the IP packets are received and processed by a H.323 protocol stack 445, and the message contents of the IP packets are forwarded to an NVP Device Controller 440. Similarly, messages from the NVP Device Controller 440 are received and converted by the H.323 protocol stack 445 into the IP packets, which are then forwarded to the access point 450 for transmission to the NVP 430.

The HVG 400 further comprises a HVG Call Control 435 for controlling communications between endpoints connected to the NVP Device Controller 440; a TAPI Application Interface 455 for the HVG 400 to exchange call control signaling messages with the System 400; and a IP Phone Proxy 400 to provide all of the necessary messages for phone devices connected to the NVP Device Controller 440 to appear as IP phone devices to the IP SP 425 registered with the System 400. The System 400 has a TAPI Server Interface 460 to interface with the TAPI Application Interface 455 of the HVG 400. The TAPI Interface 455, 460 communicates Q.931 like call control signaling messages. TAPI is a well-known Microsoft interface protocol used to establish calls between endpoints.

Further endpoints, such as, for example, other IP phones and POTS phones may be added to the System 400 via POTS device controllers and IP Device Controllers respective.

A voice recognition system (VRS) 480 is connected as an IP phone using the Minet protocol (e.g. 4025 IP Phone manufactured by Mitel Networks Corporation) to the System 400. The VRS 480 is a version of Mitel Networks Speak@Ease product modified to appear as an IP phone. Thus, to communicate with the VRS 480, the System 400 simply places a call to what the System 400 believes is an IP phone and a connection is established with the endpoint. Once a speech path is established, the VRS 480 processes incoming voice messages and matches the phrases of the voice messages received to its internal grammar definition. The VRS 480 does a best match approach to convert the voice. messages into text messages. In cases where the VRS 480 can not find a match, it responds with a message to say again or to say another phrase.

The VRS 480 forwards the text messages to a language conversion application (LCA) 485 for translation into text representations in another language. The text representations are returned to the VRS 480 and converted into voice speech of the another language as voice responses (or translated voice messages) to the voice messages. The LCA 485 is implemented using L&H™ Power Translator® Pro, but other similar text translation applications are also well known.

In operation, for example, a user at NVP 430 logs into the HVG 410 using a password. The user then dials a selected directory number (DN), which connects to the VRS 480. The HVG 410 instructs the System 400 that an IP phone device, the NVP 430, is placing a call to another local IP phone device, the VRS 430. The VRS 480 acts like an IP phone to the System 400. Using the TAPI App 455 to TAPI Server 465 interface, the IP phone proxy 470 to IP SP 425 interface, and the IP SP 425 to VRS 480 interface; a call is setup between the NVP 430 and the VRS 480. IP packets with digitized voice is then streamed directly between the NVP 430 and the VRS 480 over the LAN 310.

Once a voice connection is established between the VRS 480 and the NVP 430, the user at the NVP 430 talks to the VRS 480 and instructs the VRS 480 to convert voice messages from one language to another. For example, the VRS 480 may prompt the user to say the name of language to convert to. The user then uses the NVP 430 in a walkie-talkie fashion by pressing a button on the NVP 430 to talk and the NVP 430 responds with the converted phrase. Thus, the user can say a sentence and let another person hear the response in a different language using one telephone.

The System 400 may also be configured so that two people are able to speak in their own native languages though different telephones, with each user speaking and listening in their own language. For example, the VRS 480 is instructed to send the translated voice messages (or voice responses) to another caller or a number of other callers.

Variations and modifications of the invention are contemplated. For example, the interface to the HVG 416 does not need to be based on the H.323 standard. The interface could also be based on SIP (Session Initiation Protocol), or any other industry standard protocol. The HVG 430 may communicate with a variety of other devices (i.e. wherein the HVG establishes and controls the voice connections between the VRS 430 and another device). The VRS 480 may send translated voice messages to another audio device (e.g. a loud speaker for addressing an audience).

The language conversion application 485 may also send the translated text representation to a device with a display screen (e.g. a hand held device such as a PalmPilot® palm top computer). Likewise, a wireless handheld device (e.g. palm top computer with wireless communication capabilities) may be configured to operate as a telephone, in place of the NVP 430.

The VRS 480 may further be configured so that a user and his preferred choice of language is known to the system. The user then only needs to say the language that the user wishes to translate his voice messages into. Thus, the VRS 480 may be configured for the user to speak the name of the language for translating the voice messages.

All such alternative embodiments are believed to fall within the sphere and scope of the invention as defined by the appended claims.

What is claimed is:

1. A voice activated language translation system, comprising:
    a communication interface for handling at least one call to receive a voice message and to transmit a voice response;
    a voice recognition system connected to said communication interface for converting said voice message to a first text message in a first language;
    a text-to-speech system for converting a second text message to said voice response in a second language to transmit via said communication interface; and
    a language translation application connected to said voice recognition system and said text-to-speech system for translating said first text message from the first language to said second text message in the second language and sending said second text message to said text-to-speech system for conversion to said response,
    wherein said communication interface emulates a plurality of virtual IP phones and each virtual IP phone is able to handle said at least one call concurrently and independently of another call and wherein a plurality of directory numbers are provided such that each of the directory numbers provides a different translation service for different targeted environments.

2. The voice activated language translation system of claim 1, further comprising a configuration interface for selecting the first language and the second language.

3. The voice activated language translation system of claim 1, wherein the communication interface transmits said voice response translated from said voice message of a caller to said caller.

4. The voice activated language translation system of claim 1, wherein the communication interface transmits said voice response translated from said voice message of a first caller to a second caller.

5. The voice activated language translation system of claim 1, further comprising one of wireless phone, POTS phone, IP phone, and wireless palm top computer for originating said call.

6. A method of providing voice activated language translation, comprising:
    handling at least one call to receive a voice message;
    converting said voice message to a first text message in a first language;
    translating said first text message from the first language to a second text message in a second language;
    converting said second text message to a voice response in the second language;

handling said at least one call to transmit said response;
further comprising emulating a plurality of virtual IP phones and each virtual IP phone is able to handle said at least one call concurrently and independently of another call and wherein a plurality of directory numbers are provided for receiving the call such that each of the directory numbers provides a different translation service for different targeted environments.

7. The method of claim 6, further comprising setting the first language and the second language.

8. The method of claim 6, wherein said voice response translated from said voice message of a caller is transmitted to said caller.

9. The method of claim 6, wherein said voice response translated from said voice message of a first caller is transmitted a second caller.

10. The method of claim 6, wherein the call is received from one of wireless phone, POTS phone, IP phone, and wireless palm top computer.

* * * * *